United States Patent
Jakobs et al.

(10) Patent No.: US 10,352,300 B2
(45) Date of Patent: Jul. 16, 2019

(54) METHOD OF AUTHORIZATION FOR CONTROL ACCESS TO WIND POWER INSTALLATIONS, AND ALSO INTERFACE FOR WIND POWER INSTALLATIONS AND CERTIFICATION CENTER

(71) Applicant: WOBBEN PROPERTIES GMBH, Aurich (DE)

(72) Inventors: Thorsten Jakobs, Leezdorf (DE); Simon Demuth, Hage (DE); Helge Giertz, Leer (DE)

(73) Assignee: Wobben Properties GmbH, Aurich (DE)

( * ) Notice: Subject to any disclaimer, the term of this patent is extended or adjusted under 35 U.S.C. 154(b) by 122 days.

(21) Appl. No.: 15/540,238

(22) PCT Filed: Dec. 21, 2015

(86) PCT No.: PCT/EP2015/080736
§ 371 (c)(1),
(2) Date: Jun. 27, 2017

(87) PCT Pub. No.: WO2016/110405
PCT Pub. Date: Jul. 14, 2016

(65) Prior Publication Data
US 2017/0363065 A1 Dec. 21, 2017

(30) Foreign Application Priority Data

Jan. 9, 2015 (DE) .................. 10 2015 200 209

(51) Int. Cl.
*G06F 21/33* (2013.01)
*F03D 7/04* (2006.01)
(Continued)

(52) U.S. Cl.
CPC ............. *F03D 7/047* (2013.01); *F03D 7/048* (2013.01); *G06F 21/33* (2013.01); *H04L 9/321* (2013.01);
(Continued)

(58) Field of Classification Search
CPC .......... F03D 7/047; F03D 7/048; G06F 21/33; G06F 2221/2113; H04L 9/321;
(Continued)

(56) References Cited

U.S. PATENT DOCUMENTS 8,688,976 B2  4/2014  Busser et al.
9,294,468 B1 * 3/2016  Kilbourn ............ H04L 63/0823
(Continued)

FOREIGN PATENT DOCUMENTS

DE  10 2010 044 517 A1  3/2012
EP       1 598 729 A2  11/2005
(Continued)

*Primary Examiner* — Joseph P Hirl
*Assistant Examiner* — Stephen T Gundry
(74) *Attorney, Agent, or Firm* — Seed IP Law Group LLP

(57) ABSTRACT

A method for authorizing a user for a control access to at least one wind turbine or at least one wind farm is disclosed. In this method, a certification center first authenticates a user, and the certification center accepts a control-access type from the authenticated user. The certification center then generates an electronic certificate according to the accepted control-access type and/or according to stored access permissions of the authenticated user. Then the certificate is used for authentication with the wind turbine or with the wind farm for the purpose of performing a control access. A system for performing the method and also relates to a certification center and to an interface of a wind turbine or of a wind farm.

19 Claims, 4 Drawing Sheets

(51) Int. Cl.
*H04L 9/32* (2006.01)
*H04L 29/06* (2006.01)

(52) U.S. Cl.
CPC ........ *H04L 9/3226* (2013.01); *H04L 63/0823* (2013.01); *H04L 63/0892* (2013.01); *H04L 63/105* (2013.01); *G06F 2221/2113* (2013.01); *Y02E 10/723* (2013.01)

(58) Field of Classification Search
CPC ............... H04L 9/3226; H04L 63/0823; H04L 63/0892; H04L 63/105; Y02E 10/723
See application file for complete search history.

(56) References Cited

U.S. PATENT DOCUMENTS

| | | | | |
|---|---|---|---|---|
| 9,332,002 | B1* | 5/2016 | Bowen | H04L 63/0823 |
| 9,432,198 | B2 | 8/2016 | Falk et al. | |
| 9,838,388 | B2* | 12/2017 | Mather | H04L 63/0861 |
| 9,838,525 | B2* | 12/2017 | Bietz | H04M 1/7253 |
| 9,947,008 | B1* | 4/2018 | Camacho Diaz | G06Q 20/38215 |
| 2008/0091580 | A1* | 4/2008 | Kremen | G06Q 40/00 705/35 |
| 2008/0091581 | A1* | 4/2008 | Kremen | G06Q 40/00 705/35 |
| 2008/0091589 | A1* | 4/2008 | Kremen | G06Q 40/025 705/38 |
| 2008/0091590 | A1* | 4/2008 | Kremen | G06Q 40/025 705/38 |
| 2008/0270272 | A1* | 10/2008 | Branscomb | G06Q 40/04 705/30 |
| 2009/0125436 | A1* | 5/2009 | Palanchian | G06Q 40/04 705/37 |
| 2009/0222320 | A1* | 9/2009 | Arfin | G06Q 30/0202 705/7.31 |
| 2009/0234685 | A1* | 9/2009 | Tarbell | G06Q 10/20 705/305 |
| 2009/0234750 | A1* | 9/2009 | Arfin | G06Q 30/0601 705/26.1 |
| 2009/0234757 | A1* | 9/2009 | Tarbell | G06Q 30/04 705/30 |
| 2010/0010939 | A1* | 1/2010 | Arfin | G06Q 10/04 705/412 |
| 2010/0057480 | A1* | 3/2010 | Arfin | G06Q 10/10 705/1.1 |
| 2010/0057544 | A1* | 3/2010 | Tarbell | G06Q 30/02 705/14.1 |
| 2010/0057582 | A1* | 3/2010 | Arfin | G06Q 30/0601 705/26.1 |
| 2010/0076835 | A1* | 3/2010 | Silverman | G06Q 10/06 705/14.33 |
| 2010/0106963 | A1 | 4/2010 | Virtuoso et al. | |
| 2011/0202446 | A1* | 8/2011 | Kremen | G01D 4/004 705/37 |
| 2011/0208621 | A1* | 8/2011 | Feierstein | G06Q 30/018 705/30 |
| 2013/0035992 | A1* | 2/2013 | Silverman | G06Q 30/0233 705/14.1 |
| 2013/0252120 | A1* | 9/2013 | Robertson | C01B 13/0248 429/418 |
| 2013/0290705 | A1* | 10/2013 | Lovmand | H04L 63/0823 713/156 |
| 2014/0297206 | A1* | 10/2014 | Silverman | G01R 22/063 702/58 |
| 2015/0169024 | A1* | 6/2015 | Jammer | G06F 1/30 700/286 |
| 2015/0228039 | A1* | 8/2015 | Mahgoub | H04L 63/0823 705/311 |
| 2015/0281225 | A1* | 10/2015 | Schoen | H04L 63/06 726/9 |
| 2015/0319167 | A1* | 11/2015 | Brand | H04L 63/0853 713/156 |
| 2015/0324589 | A1* | 11/2015 | Thanos | G06F 21/60 726/1 |
| 2016/0006066 | A1* | 1/2016 | Robertson | F01N 3/00 429/418 |
| 2016/0006591 | A1* | 1/2016 | Huomo | H04B 3/542 375/295 |
| 2016/0112406 | A1* | 4/2016 | Bugrov | H04L 63/0823 726/10 |
| 2016/0209858 | A1* | 7/2016 | Ellice-Flint | G06Q 50/06 |
| 2016/0330195 | A1* | 11/2016 | Paert | G06F 21/33 |

FOREIGN PATENT DOCUMENTS

| | | |
|---|---|---|
| GB | 2487049 A | 7/2012 |
| JP | 2011-524559 A | 9/2011 |
| WO | 2011/015414 A1 | 2/2011 |

* cited by examiner

METHOD OF AUTHORIZATION FOR CONTROL ACCESS TO WIND POWER INSTALLATIONS, AND ALSO INTERFACE FOR WIND POWER INSTALLATIONS AND CERTIFICATION CENTER

BACKGROUND

Technical Field

The invention relates to a method for authorizing users for control accesses to at least one wind turbine or at least one wind farm, and relates to an interface for at least one wind turbine or for at least one wind farm, to a certification center and to a system comprising a certification center and an interface for at least one wind turbine or for at least one wind farm.

Description of the Related Art

According to the prior art, control accesses and read accesses to a wind turbine or a plurality of wind turbines organized as a wind farm are possible. Control accesses and read accesses to wind farms are implemented, for instance, by read accesses and control accesses to a wind farm controller. With a read access, a user can read, for instance, live operating data such as the power currently being fed into the power grid. Thus, read accesses are all accesses for which there is no intervention in the operation of the wind turbine, so the user has in particular no influence on the operating parameters.

Unlike a read access, a control access has a direct or indirect effect on the operation of the wind turbine, for instance by a change to operating parameters. Operating parameters are, e.g., control variables and the like. A control access can also be used, for example, to start up or shut down one or more wind turbines or to vary the amount of power, and the voltage or frequency of the power, that is fed into a power grid.

According to the prior art, a user is authenticated with a wind turbine or a wind farm by transferring a tuple of password and user identifier so that the user can identify himself with the wind farm as regards to his identity. On the basis of this transfer to the wind turbine or the wind farm, the user is then permitted control accesses and/or read accesses, where the access type, i.e., the read-access type or control-access type, of different users can be restricted differently by the wind turbine or wind farm concerned. Such restrictions are stored in the wind farm or wind turbine together with the user identifier and password.

At the very least, at least one user also has the authority to perform system-critical control-access types which include, e.g., switching on or shutting down the wind turbine or wind farm. Thus, if the access data of this user is known, namely the tuple consisting of user name and password, the wind turbine or wind farm can be accessed by critical control-access types.

Under a threat scenario resulting from human error and insider sabotage, if the access data is known for a plurality of wind farms in a region, it is hence possible to shut down these wind farms. Thus, a power grid or electricity grid in this region could completely fail because, as a result of a simultaneous shutdown of a plurality of wind farms, consumers are demanding more energy than the energy sources can provide. It is therefore desired to take measures that make control accesses, and in particular critical control accesses, to wind turbines and wind farms more secure.

In the priority application for the present application, the German Patent and Trademark Office researched the following prior art: DE 10 2010 044 517 A1, EP 1 598 729 A2, WO 2011/015414 A1.

BRIEF SUMMARY

Provided is a method for authorizing users for control accesses to at least one wind turbine or at least one wind farm, by an interface for at least one wind turbine or for at least one wind farm, by a certification center and by a system comprising a certification center and at least one interface of at least one wind turbine or of at least one wind farm.

The following steps are performed for the purpose of authorizing users for control accesses to at least one wind turbine, i.e., to one or more wind turbines, or even to one or more wind farms formed in each case by a network of wind turbines.

First, a user who authenticates himself with a certification center is authenticated by the certification center. In this process, a user transfers to a certification center for the purpose of authentication, e.g., a tuple consisting of password and user name, password and user identifier, an electronic certificate, a combination of password, user name and certificate or the like, thereby providing evidence of the personal identity of the user. If the access data is correct, i.e., the user name and password are correct and/or the certificate is correct, the user is then authenticated by the certification center, i.e., an access permission is confirmed. Hence the user is thereby authenticated with the certification center by the certification center.

The certification center accepts one or more control-access types from the authenticated user, said control-access types being transferred to the certification center in particular by the user, e.g., using input means and/or a graphical user interface.

Control-access types here refer to different forms of control access, where a control access denotes all accesses which can have an effect on functions and operation, and which therefore can result in effects on current and future operating statuses of the wind turbine or of the wind farm. Thus, a control-access type describes one or more possible control accesses such as, e.g., parameterization, the start-up and/or shutdown of one or more or all wind turbines, etc.

Thus, according to the method, the user transfers one or more control-access types to the certification center, in particular the user transfers the control-access type(s) that are intended to be used later to access a wind turbine or a wind farm.

If the certification center accepts the control-access type from the authenticated user then a digital certificate is generated by the certification center according to the accepted control-access type and/or according to stored access permissions of the authenticated user. Hence in particular the accepted control-access type(s) are also stored in the certificate, and therefore this certificate generated by the certification center can also be referred to as a token.

A certificate, also called a digital certificate, is a digital data record which is used to verify certain properties of people by means of cryptographic techniques for the purpose of authorizing the person. In addition to user-specific data such as access data, further data such as, e.g., said control-access type is also stored in the certificate in an essentially tamperproof manner, which data can be read by the wind turbine(s) or by the wind farm(s). Thus, a certificate is also a form of token, so for instance is equivalent to an electronic key, which is essentially tamperproof and on which further data is also stored in addition to the data for authorizing a user.

The certificate is used to perform an authentication with the wind turbine or the wind farm for the purpose of implementing the control-access type(s) previously transferred by the user and accepted by the certification center. In addition, according to an alternative embodiment, it is also necessary for the purpose of authentication to transfer in addition to the certificate generated by the certification center additionally user-access data such as, e.g., user identifier and password.

Thus, a central certification center is advantageously provided, which is used to coordinate control-access types of users. Direct control access by a user to a wind turbine or a wind farm without the step via the certification center is hence not possible. It can hence be guaranteed that coordination of the permitted control accesses is possible in the certification center, thereby counteracting error and sabotage. The certification center is, thus, designed to restrict the awarding of certificates such that control-access types to a plurality of wind turbines or wind farms which are requested by one or more users, i.e., accepted by the certification center, and which may for example result in a mains failure, can be inhibited.

Here and below, a user is a person, e.g., a member of maintenance staff, or else also an electronic system of a power company or of a direct seller. If the user is an electronic system, the user is authenticated automatically, e.g., by transferring a certificate.

According to one embodiment, read accesses to wind turbines and wind farms, so for instance to the wind-farm control system, is possible by certificate-independent authentication of users, in particular by means of a tuple consisting of user identifier and password. In other words, a user needs to request or apply for the certificate from the certification center only for control accesses to a wind turbine and wind farm. A read access is still possible by means of a direct authentication using a user name and password. Thus, a read access can be performed very easily and quickly by a user, and because read accesses are non-critical, the digital certificate from the certification center can be dispensed with in this case.

According to another embodiment, the certification center uses an issuing interface to issue the certificate, in particular to a processing unit of the user, with the result that the external processing unit, which is, e.g., a portable computer or another mobile device similar to a computer, can be used to perform authentication independently of the certification center.

This has the advantage that when there is no data connection to the certification center, a control access can be performed using the control-access type contained in the certificate. In remote areas in which a certificate cannot be requested from the certification center, the certificate can hence be "pre-generated" and the issued certificate can then be used locally at the wind turbine or wind farm to perform a control access even without a data connection.

According to another embodiment, the control accesses are performed directly by the certification center. For this purpose, the certification center comprises, e.g., a user interface, by means of which a user transfers control accesses directly to the certification center, and the certification center then authenticates the user together with the certificate at the wind turbine or wind farm, so that control accesses from the user received by the certification center are also forwarded to the wind turbine or wind farm or prohibited.

According to this embodiment, users in the form of power companies actually have the facility to restrict output from wind farms and to modify other operating parameters that relate to power feed-in, if grid stability makes this necessary.

After successful authentication, it is possible to perform control accesses, such as wind-farm output restrictions, for individual wind farms by a power company addressing a central interface of the system, namely the certification center, and the necessary parameters of the control access being transferred. Then the certification center generates internally on behalf of the power company a certificate for the desired action and sends the control command together with certificate (token) to the wind farm. Finally, feedback on the success of the action is given to the power company.

For safety reasons, the described interface can have a redundant design according to various embodiments, and can be implemented as various protocols such as, for example, SOAP, IEC 60870-5-104, DNP3 TCP or even Modbus TCP.

The advantage over the prior art is that the power company no longer needs to service and maintain a dedicated connection for each wind farm. Furthermore, it is also possible via this interface to provide the power company with more operating parameters (current setpoint values, possible power output etc.) of the wind farm. This form of central control is made possible for the first time by the certificate-based or token-based communication with the wind farm, because by conventional means the potential risks would be untenable.

If the users are direct sellers, the certification center can also be used by these direct sellers in order to regulate the feed-in power directly or indirectly according to economic considerations, for instance on the basis of what are known as schedules. According to the present state of the art, direct sellers have a direct connection to each individual wind farm.

The process runs in a similar way to the power company interface. The advantages are that a direct seller no longer needs to set up and maintain a multiplicity of connections. Furthermore, this method increases security.

According to another embodiment, a control system, e.g., a dynamic set of rules or a control database, in which each of a plurality of registered users, in particular every registered user, can be allocated or is allocated at least one allowed and/or one un-allowed control-access type, is stored in the certification center. According to this embodiment, the certification center generates for authenticated users certificates containing the control-access type accepted from the user only if the control-access type transferred by the user is allowed for the user in the control system. Hence the control system is like a set of permission rules, which can be static or is changed dynamically according to various factors.

Different control-access types can hence be allocated centrally in the certification center to different users of different wind farms, so that access permissions can be administered centrally for a multiplicity of wind farms or wind turbines.

According to another embodiment, each of the certificates generated by the certification center has a validity period, also known as a timestamp. After a designated validity period, an electronic certificate thereby loses the permission to authenticate a user for a control access to a wind turbine or a wind farm.

A validity period is stored, for example in the control database, individually for each user and/or each control-access type, or a general validity period is designated for all the certificates in the certification center and is used to generate the certificates.

This simplifies the coordination of the control-access types currently allocated by the certification center, because the validity periods of the currently issued certificates can be stored in the certification center. The certification center, thus, always knows which control-access types and how many are currently possible. Hence a certificate does not need to be returned after use to the certification center by the user, but expires "automatically."

According to another embodiment, a maximum total number or a maximum number per predefined region is stored in the control system for each control-access type and/or for all control-access types. Certificates are generated or awarded for a control-access type only in such a number that the number, or total number, of awarded certificates that are currently valid on the basis of their validity period lies below the maximum total number or the maximum number for the given region.

This ensures that for control-access types and in particular critical control-access types such as, e.g., shutting down wind turbines, only so many certificates are generated as to keep the power grid stable, in particular in specific regions. This avoids the risk of permitting so many control accesses having a critical control-access type in one region or in total as to cause the power grid to collapse.

According to another embodiment, the certification center generates the certificate also according to at least one ascertained current or predicted parameter, in particular according to a grid status parameter, the weather and/or the status of the wind turbines or other wind turbines. It is thus possible, for instance, to adjust the maximum total number or the maximum number per predefined region according to a grid parameter such as, e.g., a grid status parameter. In regions in which a weak grid, for instance, is detected from the current ascertained parameters, then a complete shut-down or a reduction in the power feed-in of any wind turbine is not permitted, or is only permitted for very few wind turbines. Hence the certification center limits or restricts for this region the number of control-access types.

The control system is hence dynamically adjusted, for instance by external parameters.

Also provided is an interface for at least one wind turbine, i.e., one or more wind turbines, in particular in a wind farm. The interface is designed to receive an electronic digital certificate which has been generated by a certification center and to allow on the basis of the electronic certificate, in particular on the basis of the information stored in the certificate, control accesses of the control-access type(s) stored in the certificate. Control accesses to a wind turbine or a wind farm are hence possible only by means of a pre-generated certificate that was generated by the certification center.

According to one embodiment, the interface of the wind turbine or of the wind farm is also designed to allow a validity period stored in the certificate to be read, and to allow control accesses only if a validity period is valid.

Thus, by checking a validity period of the certificate, certificates that have already expired can be classified so that a user using such a certificate is not allowed to perform a control access.

According to another embodiment, the interface of the wind turbine or of the wind farm is designed to read a turbine identifier, which is stored in the certificate, and to allow control accesses only for a turbine identifier that matches the turbine identifier of the wind turbine to which access is required.

Checking a turbine identifier in the certificate means that it is possible to allow a user access only to wind turbines cleared by the certification center.

In addition, provided is a certification center for authenticating users for control accesses to at least one wind turbine. The certification center comprises an interface for authenticating users with the certification center, which interface is also designed to accept a control-access type from the user to the certification center.

The certification center is also designed to generate an electronic digital certificate according to the transferred control-access type, i.e., the control-access type accepted by the certification center, and/or according to stored access permissions of the authenticated user. The interface is also used to issue the generated certificate.

Thus, the certification center can be used for awarding centrally the access permissions of the control accesses to a multiplicity of wind turbines or wind farms, with the result that critical control-access types can be controlled.

According to one embodiment, the certification center is designed to generate the certificate such that it contains a validity period and/or one or more turbine identifiers, said validity period and/or turbine identifier(s) being stored in the certificate.

Hence using the certificate, a user is allowed to perform control accesses having the control-access type stored in the certificate only on wind turbines that are cleared by the certification center and have corresponding turbine identifiers and/or only for a time period specified by the validity period.

According to another embodiment, the certification center comprises a control system, by means of which control system at least one registered user or each of a plurality of registered users, in particular every registered user, can be allocated or is allocated at least one allowed and/or un-allowed control-access type. The certification center is designed to generate electronic, i.e., digital, certificates for pre-authenticated users if the control-access type transferred by the user concerned is designated in the control database as allowed.

An access-permission administration system can hence be stored in a single control database in the certification center, and can be used for central administration of the user permissions.

According to another embodiment, the certification center is designed to allocate a validity period to the certificates, i.e., to store a validity period in the certificate.

According to another embodiment, a maximum total number or a maximum number per predefined region is stored for each control-access type in the control database. The certification center is also designed such that certificates are generated for a control-access type only if the number of the electronic certificates containing this control-access type that have already been awarded and are currently valid remains below the maximum total number or the maximum number for the region. Hence only as many certificates for, e.g., critical control-access types are awarded or generated that will continue to ensure a stable grid.

According to another embodiment, the interface of the certification center is designed to accept from the authenticated user also turbine identifiers in addition to control-access types, which turbine identifiers uniquely identify one or more wind turbines or one or more wind farms.

Hence the authenticated user supplies to the certification center via the interface of the certification center not only at least one control-access type but also at least one turbine identifier. The certification center is then designed to generate the electronic certificate according to the turbine identifier. The transferred turbine identifier is accordingly stored in the certificate. Hence access is possible only to the wind turbines or the wind farm for which the turbine identifier is valid.

It is thereby possible to restrict the control accesses to wind turbines previously established with the certification center.

According to another embodiment, the certification center comprises a further interface in order to receive parameters such as, e.g., prevailing weather data, weather forecasts, current grid statuses and/or grid-status predictions, and to adjust the control database according to these parameters.

This hence provides a dynamic control system, which is updated or changed on the basis of received parameters. In particular, it is possible to use these parameters to adjust, for example, the maximum total number or the maximum number per defined region. Thus, in a region in which a weak power grid exists already, safeguards can be made against control accesses that would degrade this grid status further. For this purpose, for example, the maximum total number of control-access types and a maximum number of permitted wind turbines would be reduced.

Provided is a system comprising an interface of a wind turbine or of a wind farm according to any of the above-mentioned embodiments and a certification center according to any of the above-mentioned embodiments, in particular for implementing a method according to any of the above-mentioned embodiments.

BRIEF DESCRIPTION OF THE SEVERAL VIEWS OF THE DRAWINGS

The invention is described in greater detail below using exemplary embodiments with reference to the accompanying drawings, in which.

DETAILED DESCRIPTION

Figure 1:
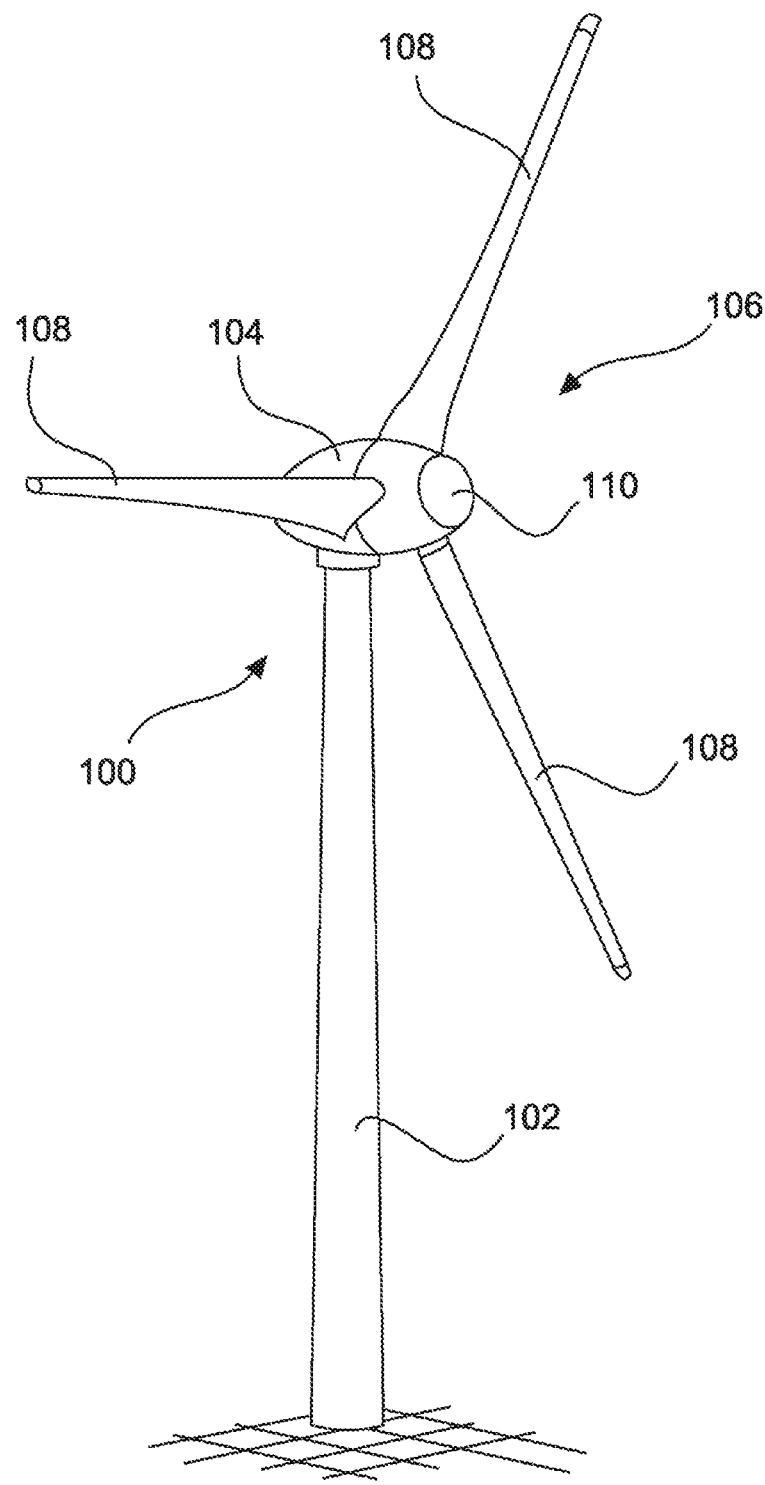
FIG. 1 shows a wind turbine.

FIG. 1 shows a schematic diagram of a wind turbine. The wind turbine 100 comprises a tower 102 and a nacelle 104 on the tower 102. An aerodynamic rotor 106 having three rotor blades 108 and a spinner 110 is provided on the nacelle 104. During operation of the wind turbine, the wind causes the aerodynamic rotor 106 to rotate, which hence also turns a generator rotor that is coupled directly or indirectly to the aerodynamic rotor 106. The electric generator is arranged in the nacelle 104 and generates electrical energy. The pitch angle of the rotor blades 108 can be varied by pitch motors on the rotor-blade roots 108b of the respective rotor blades 108.

Figure 2:
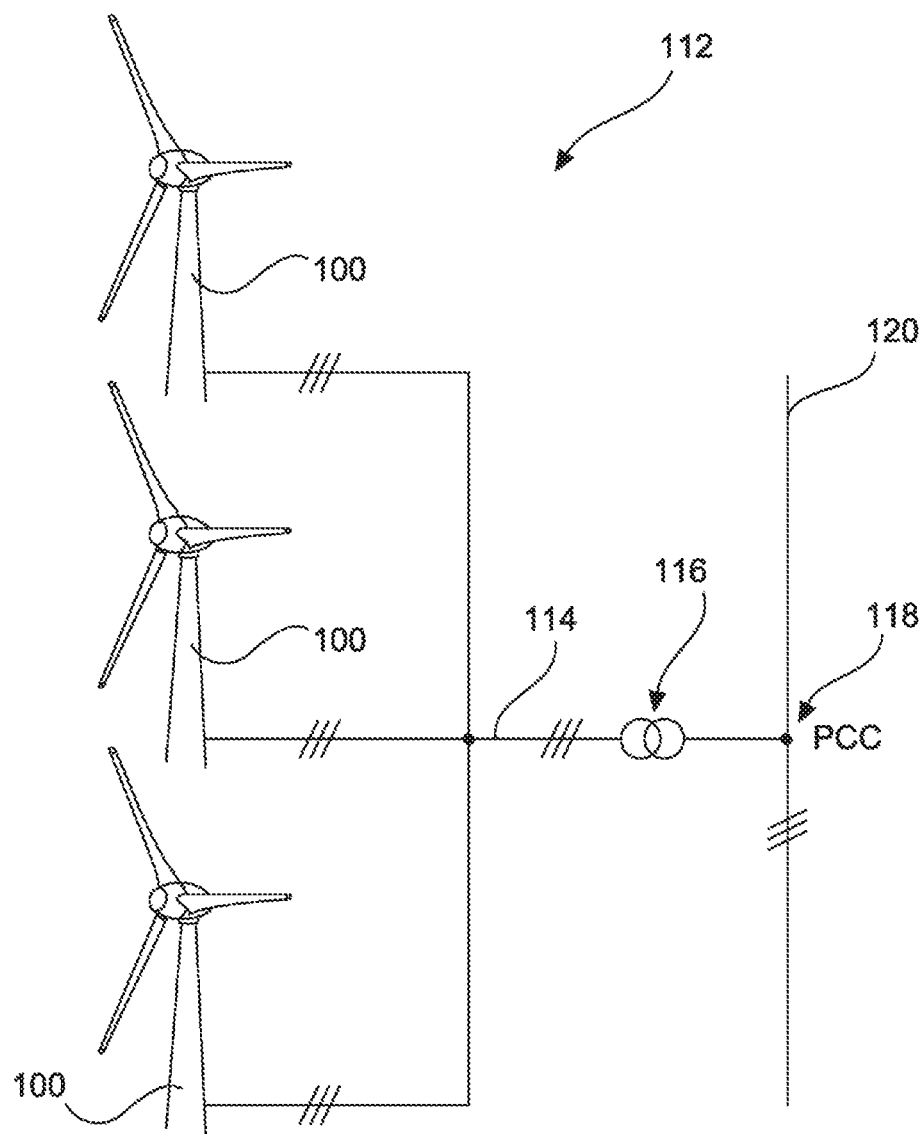
FIG. 2 shows a wind farm.

FIG. 2 shows a wind farm 112 comprising by way of example three wind turbines 100, which may be identical or different. The three wind turbines 100 are hence representative of in principle any number of wind turbines in a wind farm 112. The wind turbines 100 provide their power, specifically the generated electrical current, via an electrical wind-farm network 114. The current or power generated by each of the wind turbines 100 is summated in this network, and a transformer 116 which steps up the voltage in the wind farm is usually provided in order to feed into the power grid 120 at the point of common coupling (PCC) 118. FIG. 2 is just a simplified representation of a wind farm 112, which does not show a controller for instance, although obviously a controller exists. The wind-farm network 114, for example, can also have a different design, for instance a design in which a transformer is present at the output of each wind turbine 100, to name just one different exemplary embodiment.

Figure 3:
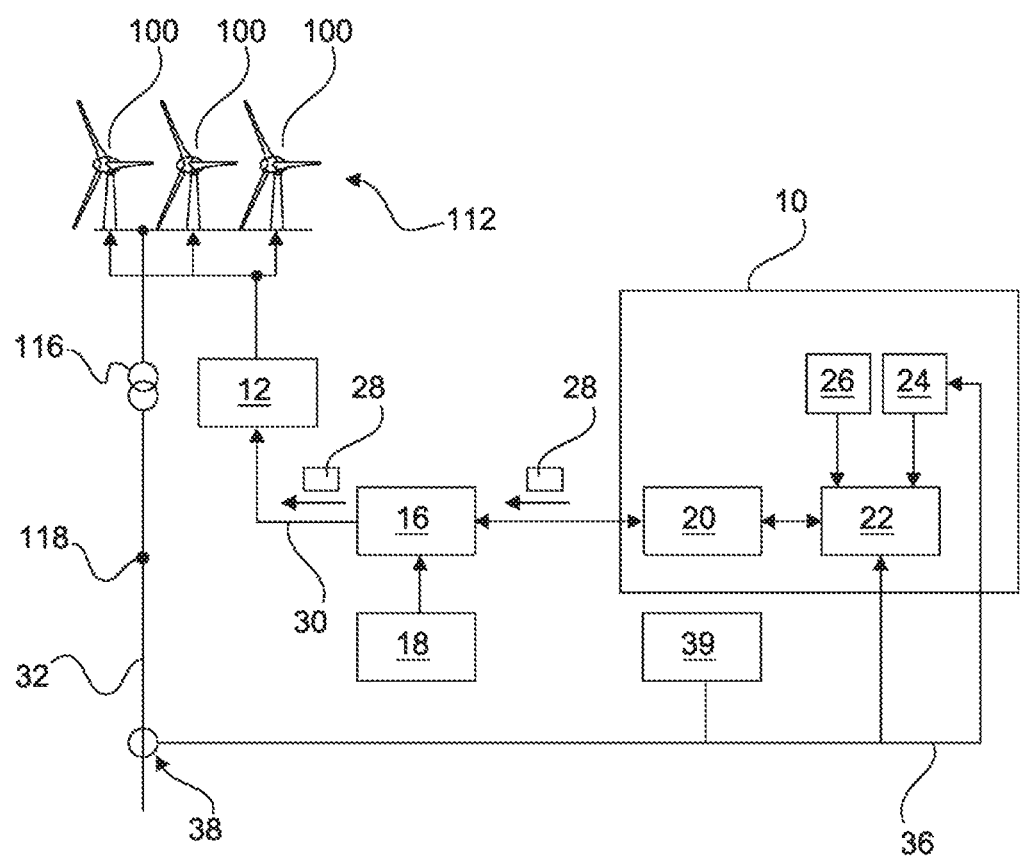
FIG. 3 shows an exemplary embodiment of a system.

FIG. 3 shows an exemplary embodiment of the system, which comprises in particular a certification center 10 and an interface 12 of a wind farm 112. The interface 12 of the wind farm 112 is, e.g., the interface of a SCADA system, where SCADA stands for Supervisory Control And Data Acquisition.

FIG. 3 also shows a mobile device 16 of a user 18. The user 18 makes a connection via the mobile device 16 to an interface 20 of the certification center 10. For the purpose of authenticating the user 18, the mobile device 16 transmits to the interface 20 a user name and a password of the user 18. In addition, the user 18 transmits a control-access type and a turbine identifier to the interface 20 by means of the mobile device 16. The turbine identifier specifies to which wind farm the user 18 wishes to make a control access having the transmitted control-access type.

The interface 20 transmits the transferred data to a processor 22, which first checks using a control system 24 whether the authenticated user 18 is permitted to perform the requested control-access type on the wind farm specified by the turbine identifier.

In addition, the processor 22 checks using the control system 24 whether a maximum number of control accesses of the requested control-access type is already exceeded. If this number is not exceeded, then the processor 22 generates a certificate. The certificate contains a validity period, which is created by a date-and-time source 26. The date-and-time signal is here determined, e.g., from a GPS signal, and transmitted to the processor. Then, in the processor 22, the validity period is stored in the certificate for a time period, which in particular is predefined by the control system 24. Examples of validity periods are, for instance, two hours, eight hours, one day or five days.

The certificate that was generated by the processor 22 also contains the control-access type transferred by the user 18 to the interface 20 using the mobile device 16, the turbine identifier and further cryptographic parameters for verifying the authenticity of the certificate.

The certificate 28 is transmitted via the interface 20 to the mobile device 16. By entering his user name and password, the user 18 can initiate a read access to the wind farm 112 and can read data from the wind farm 112 via a further data connection 30 between the mobile device 16 and the interface 12 of the wind farm 112. If, however, the user wants to make a write access, which in this context corresponds to the control access, to the wind farm 112, then the certificate 28 is transferred via the further data connection 30 to the interface 12 of the wind farm 112. In the wind farm 112 or in a controller (not shown here) of the wind farm 112, the certificate which has been imported via the interface 12 of the windfarm 112, is then checked for authenticity.

In addition, the interface 12 of the wind farm checks whether the certificate 28 is still valid, i.e., the validity period has not elapsed yet, and whether the turbine identifier stored in the certificate matches the turbine identifier of the windfarm. Given a valid validity period, a matching turbine identifier and an authentic certificate, the user 18 is then allowed control accesses to the windfarm 112 that relate to the control-access types stored in the certificate 28. The user 18 can thereby make a control access to the wind farm 112 via the mobile device 16.

If the power grid 32 to which the windfarm 112 is connected via a transformer 116 and a point of common coupling 118 is weak or unstable, for instance because all the electrical power generators connected to this grid are currently feeding only a small amount of power into the network, this is detected by the certification center 10 by means of externally supplied parameters 36. A parameter 36 can be ascertained, for instance, by a system measurement or frequency measurement 38 of the power grid 32 to which the windfarm 112 is connected.

In addition, a weather database 39 is provided, from which the prevailing and forecast weather data is transferred to the certification center and/or retrieved by the certification center. According to other exemplary embodiments, the weather database 39 is a complete weather system for weather recording and forecasting.

If a user 18 now transfers a control-access type, which might be critical for the grid network 32, to the interface 20 for certificate generation in the processor 22, then a critical control-access type of this kind is prohibited, because the control database 24 has been dynamically updated previously by the parameter 32 and as a result of which, critical control-access types that relate to the windfarms 112 in the region of the power grid 32 are identified categorically as prohibited.

In this last-mentioned case, the interface 20 does not issue the certificate 28 to the mobile device 16. Instead, the interface 20 issues a message to the mobile device 16 that such a control-access type is currently not possible.

Figure 4:
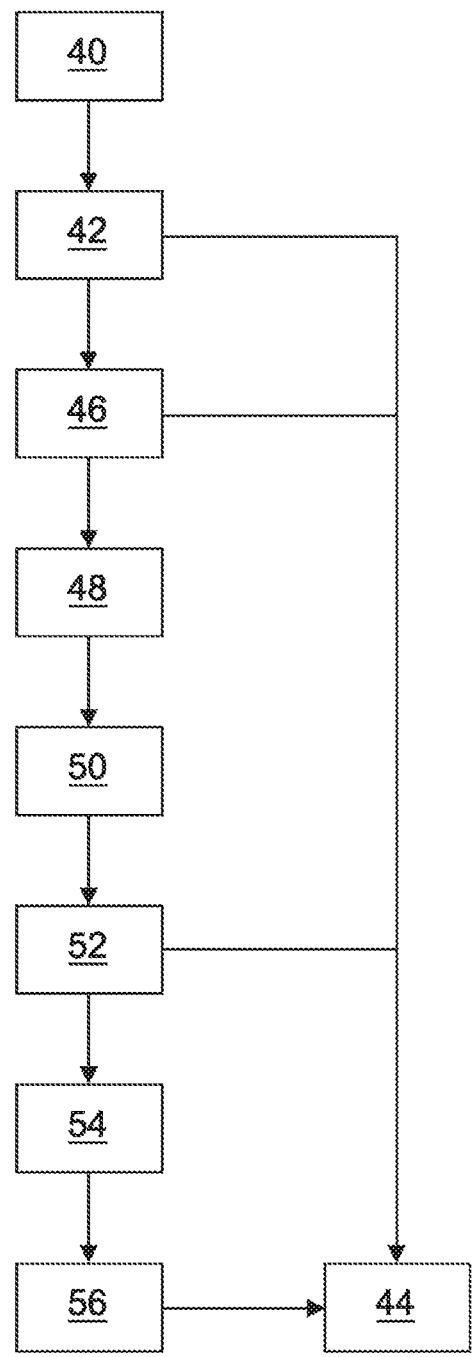
FIG. 4 shows a flow sequence of an exemplary embodiment of a method.

FIG. 4 shows the sequence flow of an exemplary embodiment of the method. In the first step 40, a password, a user name, a required control-access type and a turbine identifier are transferred to an interface 20 of a certification center 10. In the next step 42, the user, if registered in the certification center 10 and the password and user name are correct, is authenticated and hence authorized for further communication with the certification center 10. If an incorrect user name or an incorrect password has been entered, then access terminates in the step 44.

If user name and password agree with stored data in the control system 24, then in a next step 46, a check is made as to whether the control-access type is allowed for the authenticated user to the wind turbine 100 having the transferred turbine identifier. If the control-access type is not allowed for the user then the method terminates again in the step 44. If the control-access type and the selected wind turbine 100 is allowed for the user, then in a next step 46, the certification center checks on the basis of the number of currently valid requested control accesses to wind farms in the same region, whether the requested control-access type is allowed. If this control-access type is not allowed, then the method terminates again in the step 44.

If the control-access type is currently allowed, then a certificate 28 is generated in a step 48, which certificate 28 comprises the user name, the turbine identifier, the control-access type and a timestamp or validity period. The certificate 28 is then issued to a mobile device 16 of the user 18 in a step 50.

In the next step 52, the user authenticates himself with a wind turbine 100 using the mobile device 16, re-entering for this purpose a password and a user name via an interface 12 of a wind turbine 100. If the transferred user name and transferred password match the user name and password stored in the wind turbine, the user 18 is then authorized for read accesses. Otherwise the method terminates again in the step 44.

After successful authorization of the user 18 for read accesses, the mobile device 16 transfers the certificate 28 to the interface 12 of the wind turbine 100 in the step 54, and the user is authorized for the control accesses stored in the certificate if the turbine identifier in the certificate matches the turbine identifier of the wind turbine 100 and if the validity period has not expired yet.

In the step 56, the user is then allowed control accesses according to the control-access type(s) stored in the certificate 28, and the user 18 can then perform a control action. Once the control accesses have been performed, the method terminates in the step 44.

The invention claimed is:

1. A method, comprising:
authorizing users for control accesses to at least one wind turbine or at least one wind farm, wherein authorizing the users comprises:
at a certification center, authenticating a user,
at the certification center, accepting at least one control-access type from the authenticated user,
at the certification center, generating an electronic certificate containing a control-access type according to at least one of: the accepted control-access type and stored access permissions of the authenticated user, and
using the certificate for authentication of the at least one wind turbine or the at least one wind farm for performing control accesses having the control-access type, wherein the certificate contains a validity period, and
storing, by a control system, for each control-access type, at least one of a maximum total number and a maximum number per predefined region, and wherein certificates are generated for the control-access type only if a number of the certificates that have already been awarded for the region and are currently valid on the basis of their validity period is less than at least one of the maximum total number and the maximum number per predefined region.

2. The method according to claim 1, further comprising:
authorizing read access for the user by certificate-independent authentication of a user identifier and a password of a user using an interface of at least one of the wind turbine or at least one of the wind farm.

3. The method according to claim 1, further comprising:
issuing, by an interface of the certification center, the certificate to a processing unit;
performing, by the processing unit, authentication with the interface of the at least one wind turbine or the at least one wind farm; and
performing, by the interface of the at least one wind turbine or the at least one wind farm, control accesses to the at least one wind turbine or the at least one wind farm independently of the certification center.

4. The method according to claim 3, wherein the certification center performs the authentication with the interface of the at least one wind turbine or the at least one wind farm and performs control accesses to the at least one wind turbine or the at least one wind farm.

5. The method according to claim 1, further comprising:
allocating, by the control system of the certification center, at least one of an allowed and an un-allowed control-access type to one registered user, each of a plurality of registered users, or every registered user, and generating, by the certification center, certificates of the authenticated user having the accepted control-access type only when the accepted control-access type is designated in the control system as allowed for the user.

6. The method according to claim 1, further comprising: generating, by the certification center, the certificate containing at least one turbine identifier.

7. A certification center for authorizing users for control accesses to at least one wind turbine or to at least one wind farm, comprising:
an interface for authenticating a user with the certification center and for transferring at least one control-access type to the certification center,
wherein the certification center is configured to generate a certificate containing a control-access type according to at least one of the control-access type and stored access permissions of the authenticated user,
wherein the interface is configured to issue the electronic certificate,
wherein at least one of a maximum total number and a maximum number per predefined region is stored for each control-access type in the control system, and
wherein the certification center is configured to generate certificates for a control-access type only if a number of a awarded certificates of the control-access type that are currently valid for the region is less than the at least one of the maximum total number and the maximum number for the region.

8. The certification center according to claim 7, wherein the certification center comprises a control system using which one registered user, each of a plurality of registered users, or every registered user is allocated at least one of an allowed and an un-allowed control-access type, and
the certification center is configured to generate certificates for an authenticated user if the control-access type transferred by the user is designated in the control system as allowed for the user.

9. The certification center according to claim 8, wherein the certification center is configured to allocate a validity period to the certificates.

10. The certification center according to claim 8, wherein the interface of the certification center is configured to accept, using the interface, at least one turbine identifier of at least one wind turbine to be controlled or of at least one wind farm to be controlled, and
the certification center is configured to generate the electronic certificate with the certification center according to the control-access type, the turbine identifier and stored access permissions of the authenticated user.

11. A system, comprising:
a certification for authorizing users for control accesses to at least one wind turbine or to at least one wind farm, comprising:
an interface for authenticating a user with the certification center and for transferring at least one control-access type to the certification center,
wherein the certification center is configured to generate a certificate containing a control-access type according to at least one of the control-access type and stored access permissions of the authenticated user,
wherein the interface is configured to issue the electronic certificate,
wherein at least one of a maximum total number and a maximum number per predefined region is stored for each control-access type in the control system, and
wherein the certification center is configured to generate certificates for a control-access type only if a number of a awarded certificates of the control-access type that are currently valid for the region is less than the at least one of the maximum total number and the maximum number for the region.

12. A method, comprising:
authorizing users for control accesses to at least one wind turbine or at least one wind farm, wherein authorizing the users comprises:
at a certification center, authenticating a user,
at the certification center, accepting at least one control-access type from the authenticated user,
at the certification center, generating an electronic certificate containing a control-access type according to at least one of: the accepted control-access type and stored access permissions of the authenticated user, and
using the certificate for authentication of the at least one wind turbine or the at least one wind farm for performing control accesses having the control-access type, wherein the certification center generates the certificate also according to at least one ascertained current or predicted parameter, wherein the at least one ascertained current or predicted parameter includes a grid status, weather or a status of one or more wind turbines.

13. The method according to claim 12, further comprising:
authorizing read access for the user by certificate-independent authentication of a user identifier and a password of a user using an interface of at least one of the wind turbine or at least one of the wind farm.

14. The method according to claim 12, further comprising:
issuing, by an interface of the certification center, the certificate to a processing unit;
performing, by the processing unit, authentication with the interface of the at least one wind turbine or the at least one wind farm; and
performing, by the interface of the at least one wind turbine or the at least one wind farm, control accesses to the at least one wind turbine or the at least one wind farm independently of the certification center.

15. The method according to claim 12, further comprising:
generating, by the certification center, the certificate containing at least one of a validity period and at least one turbine identifier.

16. A certification center for authorizing users for control accesses to at least one wind turbine or to at least one wind farm, comprising:
an interface for authenticating a user with the certification center and for transferring at least one control-access type to the certification center,
wherein the certification center is configured to generate a certificate containing a control-access type according to at least one of the control-access type and stored access permissions of the authenticated user,
wherein the interface is configured to issue the electronic certificate,
wherein the certification center comprises a further interface, wherein the further interface is configured to:

receive at least one parameter including at least one of prevailing weather data, weather forecasts, a current grid status and grid-status predictions, and dynamically adjust the control system according to the at least one parameter.

17. The certification center according to claim 16, wherein the certification center comprises a control system using which one registered user, each of a plurality of registered users, or every registered user is allocated at least one of an allowed and an un-allowed control-access type, and the certification center is configured to generate certificates for an authenticated user if the control-access type transferred by the user is designated in the control system as allowed for the user.

18. The certification center according to claim 17, wherein the certification center is configured to allocate a validity period to the certificates.

19. The certification center according to claim 17, wherein:

the interface of the certification center is configured to accept, using the interface, at least one turbine identifier of at least one wind turbine to be controlled or of at least one wind farm to be controlled, and the certification center is configured to generate the electronic certificate with the certification center according to the control-access type, the turbine identifier and stored access permissions of the authenticated user.

\* \* \* \* \*